United States Patent
Yamamoto et al.

(10) Patent No.: US 8,822,050 B2
(45) Date of Patent: Sep. 2, 2014

(54) ELECTRIC STORAGE APPARATUS

(75) Inventors: Nobuo Yamamoto, Nisshin (JP);
Mizuho Matsumoto, Toyota (JP); Toru Nakai, Kiyosu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/424,474

(22) Filed: Mar. 20, 2012

(65) Prior Publication Data

US 2012/0251850 A1 Oct. 4, 2012

Related U.S. Application Data

(63) Continuation of application No. PCT/JP2011/001987, filed on Apr. 1, 2011.

(51) Int. Cl.
*H01M 2/12* (2006.01)
*H01M 2/04* (2006.01)
*H01M 2/06* (2006.01)

(52) U.S. Cl.
USPC .................................. 429/53; 429/82; 429/89

(58) Field of Classification Search
USPC ...................... 429/53–56, 121–347
See application file for complete search history.

(56) References Cited

U.S. PATENT DOCUMENTS

| 2006/0099494 A1* | 5/2006 | Jung et al. | 429/72 |
| 2006/0257733 A1* | 11/2006 | Kim et al. | 429/185 |
| 2011/0052949 A1 | 3/2011 | Byun et al. | |
| 2011/0135976 A1* | 6/2011 | Byun | 429/56 |

FOREIGN PATENT DOCUMENTS

| JP | 2007-179803 | 7/2007 |
| JP | 2008-117605 | 5/2008 |
| JP | 2009-37816 | 2/2009 |
| JP | 2010-176867 | 8/2010 |
| JP | 2010-277936 | 12/2010 |
| JP | 2010-287457 | 12/2010 |

* cited by examiner

*Primary Examiner* — Kenneth Douyette
*Assistant Examiner* — James Lee
(74) *Attorney, Agent, or Firm* — Finnegan, Henderson, Farabow, Garrett & Dunner, LLP

(57) ABSTRACT

An electric storage apparatus has an electric-generating element performing charge and discharge and a case accommodating the electric-generating element and an electrolytic solution. The case has an injection portion, a cap, a worked portion, and a valve. The injection portion is used for injecting the electrolytic solution into the case. The cap closes the injection portion. The worked portion is formed along the outer shapes of the injection portion and the cap by working the wall face of the case. The valve is used for discharging gas produced within the case to the outside of the case and is provided between the injection portion and the worked portion.

12 Claims, 8 Drawing Sheets ated application of International Application No. PCT/JP2011/001987, filed Apr. 1, 2011 the contents of which are incorporated herein by reference.

ELECTRIC STORAGE APPARATUS

CROSS-REFERENCE TO RELATED APPLICATIONS

This application is a continuation application of International Application No. PCT/JP2011/001987, filed Apr. 1, 2011 the contents of which are incorporated herein by reference.

TECHNICAL FIELD

The present invention relates to an electric storage apparatus in which a valve is formed in a case.

BACKGROUND ART

A cell has an electric-generating element for performing charge and discharge and a battery case for housing the electric-generating element. The battery case accommodates an electrolytic solution in addition to the electric-generating element. For manufacturing the cell, the electric-generating element is put into the battery case and then the electrolytic solution is injected into the battery case by using an injection port formed in the battery case. The injection port is closed by a cap after the injection of the electrolytic solution.

The battery case has a valve for discharging gas produced within the battery case to the outside thereof. When the internal pressure of the battery case reaches the operation pressure of the valve due to the production of the gas, the valve changes from a closed state to an open state to allow the discharge of the gas.

PRIOR ART DOCUMENTS

Patent Documents

[Patent Document 1] Japanese Patent Laid-Open No. 2010-176867
[Patent Document 2] Japanese Patent Laid-Open No. 2009-037816
[Patent Document 3] Japanese Patent Laid-Open No. 2007-179803

DISCLOSURE OF THE INVENTION

Problems to be Solved by the Invention

In the configuration in which the injection port and the valve are formed in the battery case, variations occur in the strength of the battery case depending on the position relationship between the injection port and the valve. When such variations occur in the strength of the battery case, stress may concentrate on a portion of the valve. Specifically, when the internal pressure of the battery case is increased due to the production of gas, the pressure may easily be applied only to the portion of the valve.

Means for Solving the Problems

An electric storage apparatus according to the present invention has an electric-generating element performing charge and discharge and a case accommodating the electric-generating element and an electrolytic solution. The case has an injection portion, a cap, a worked portion, and a valve. The injection portion is used for injecting the electrolytic solution into the case. The cap is used for closing the injection portion. The worked portion is formed along the outer shapes of the injection portion and the cap by working the wall face of the case. The valve is used for discharging gas produced within the case to the outside of the case and is provided between the injection portion and the worked portion.

The worked portion can be formed of a protrusion and a depression formed in at least one of an inner wall face and an outer wall face of the case. The inner wall face of the case is a wall face opposite to the electric-generating element, and the outer wall face of the case is a wall face on the outside of the electric storage apparatus. The injection portion and the worked portion can be provided at positions symmetrical with respect to the valve. This can provide the case structure symmetrical with respect to the valve to suppress variations in the strength of the case.

A positive electrode terminal and a negative electrode terminal connected to the electric-generating element can be fixed to the case. The positive electrode terminal and the negative electrode terminal can be provided at positions symmetrical with respect to the valve.

The case can be formed of a case body including an opening portion for inserting the electric-generating element and a lid closing the opening portion. The lid can be provided with the injection portion, the cap, the worked portion, and the valve. The valve can be provided at the center of the lid. The valve provided at the center of the lid can easily achieve the structure symmetrical with respect to the valve.

The valve can be provided by using a valve irreversibly changing from a closed state to an open state. Since this valve is realized through a break of a portion of the case, the worked portion can be used to suppress variations in the strength of the case, so that it is possible to prevent stress from concentrating only on a portion of the valve and break the portion.

The cap can be formed of a cap body fixed to the injection portion and a rubber placed between the cap body and the injection portion. With the use of the rubber, elastic deformation of the rubber can bring the rubber into intimate contact with the injection portion to easily prevent any leak of the electrolytic solution from the injection portion.

Effect of the Invention

According to the present invention, the worked portion has a shape formed along the outer shapes of the injection portion and the cap, and the injection portion and the worked portion are provided on both sides of the valve. This can suppress variations in the strength of the case around the valve to suppress stress concentration only on a portion of the valve.

MODE FOR CARRYING OUT THE INVENTION

Embodiments of the present invention will hereinafter be described.

Embodiment 1

Figure 1:
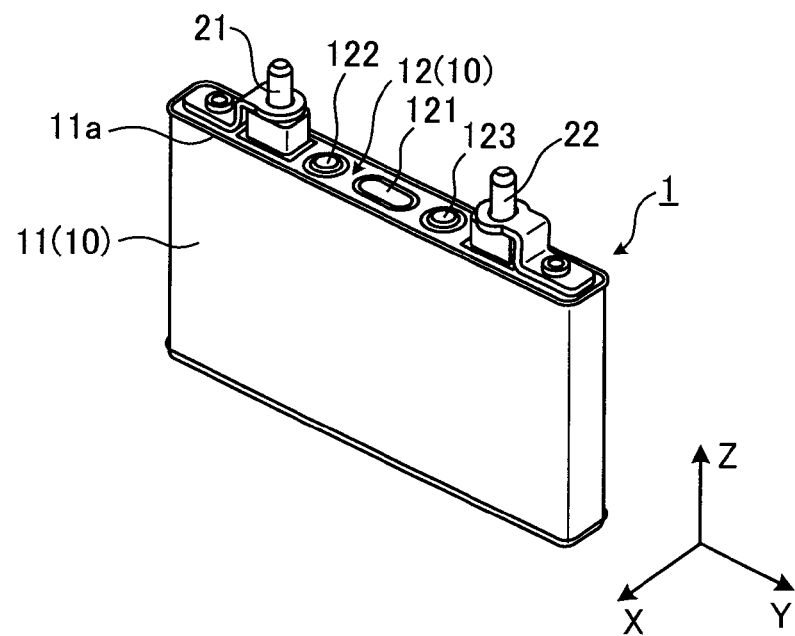
FIG. 1 is a diagram showing the outer appearance of a cell which is Embodiment 1.
Figure 2:
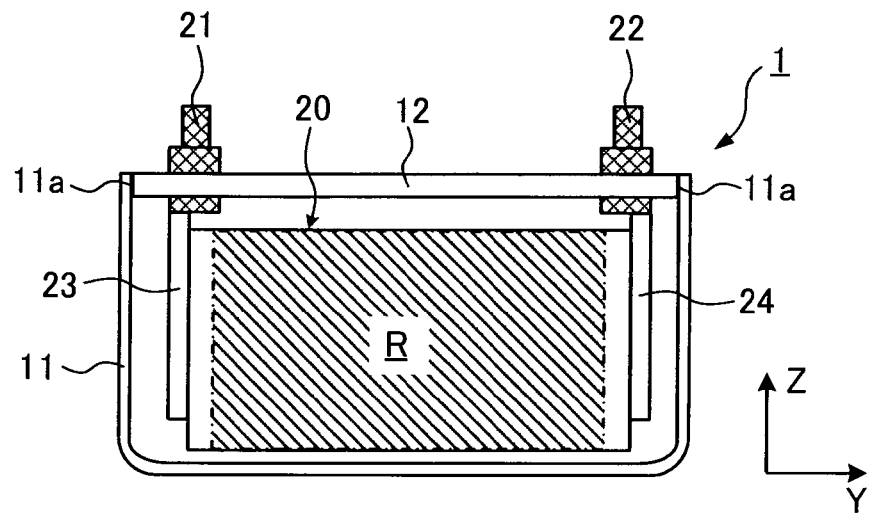
FIG. 2 is a diagram showing the internal structure of the cell which is Embodiment 1.

The structure of a cell (corresponding to an electric storage apparatus) which is Embodiment 1 will be described. FIG. 1 is a diagram showing the outer appearance of the cell which is the present embodiment, and FIG. 2 is a diagram showing the internal structure of the cell. In FIG. 1 and FIG. 2, an X axis, a Y axis, and a Z axis represent axes orthogonal to each other. The relation among the X axis, the Y axis, and the Z axis applies to other figures.

The cell 1 can be used as a power source for running a vehicle. Specifically, a plurality of cells 1 can be connected electrically in series to provide an assembled battery which can be mounted on the vehicle. Electric energy output from the assembled battery is converted by a motor generator into kinetic energy which can be used for running the vehicle. Kinetic energy generated in braking of the vehicle is converted by the motor generator into electric energy which can be stored in the assembled battery.

The cell 1 is a cell of a so-called square type. A secondary battery such as a nickel metal hydride battery or a lithium-ion battery can be used as the cell 1. Instead of the secondary battery, an electric double layer capacitor (capacitor) can be used.

The cell 1 has a battery case 10 and an electric-generating element 20 housed in the battery case 10. The battery case 10 is formed in a shape conforming to a rectangle and has a case body 11 and a lid 12. The case body 11 and the lid 12 can be formed of metal. The case body 11 has an opening portion 11a for inserting the electric-generating element 20 thereinto. The lid 12 closes the opening portion 11a of the case body 11, and the battery case 10 is hermetically sealed. The lid 12 and the case body 11 can be fixed by welding, for example.

A positive electrode terminal 21 and a negative electrode terminal 22 are electrically insulated from each other and fixed to the lid 12. The positive electrode terminal 21 passes through the lid 12 and is electrically connected to the electric-generating element 20 through a positive electrode tab 23. The positive electrode tab 23 can be connected to the positive electrode terminal 21 and the electric-generating element 20 by welding, for example. The negative electrode terminal 22 passes through the lid 12 and is electrically connected to the electric-generating element 20 through a negative electrode tab 24. The negative electrode tab 24 can be connected to the negative electrode terminal 22 and the electric-generating element 20 by welding, for example.

The lid 12 has a valve 121 which is used for discharging gas produced within the battery case 10 to the outside thereof. The valve 121 is a so-called break-type valve. When the internal pressure of the battery case 10 reaches the operation pressure of the valve 121 due to the production of the gas, the valve 121 irreversibly changes from a closed state to an open state.

While the valve 121 of the break type is used in the present embodiment, a valve of a so-called recovery type can be used.

The valve of the recovery type is a valve which reversibly changes between a closed state and an open state. When the internal pressure of the battery case 10 reaches the operation pressure of the valve, the valve changes from the closed state to the open state. When the internal pressure of the battery case 10 falls below the operation pressure of the valve, the valve changes from the open state to the closed state.

The lid 12 has a cap 122 which is used for closing an injection portion, later described. The cap 122 is provided between the positive electrode terminal 21 and the valve 121. The lid 12 has a worked portion 123 which is provided between the negative electrode terminal 22 and the valve 121. The sectional shape of the worked portion 123 is formed in a shape conforming to the sectional shapes of the cap 122 and the injection portion.

While the cap 122 is placed between the positive electrode terminal 21 and the valve 121 and the worked portion 123 is placed between the negative electrode terminal 22 and the valve 121 in the present embodiment, the present invention is not limited thereto. Specifically, the worked portion 123 can be placed between the positive electrode terminal 21 and the valve 121 and the cap 122 can be placed between the negative electrode terminal 22 and the valve 121.

Figure 3:
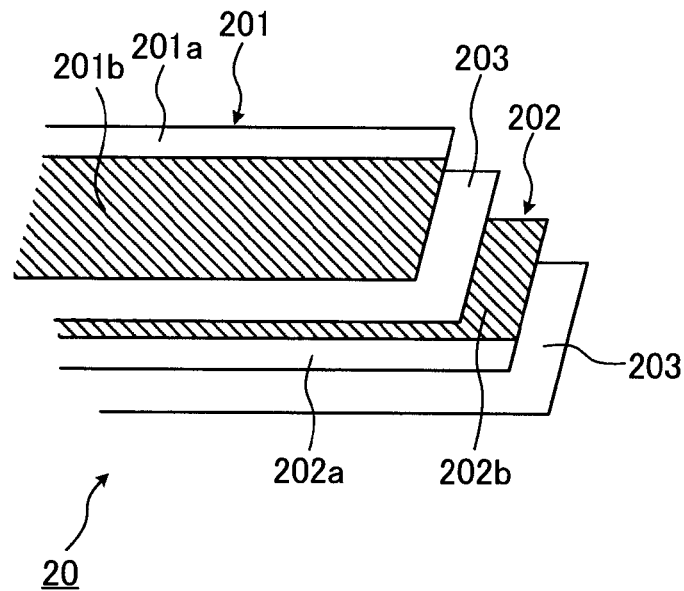
FIG. 3 is a developed view of an electric-generating element.

Next, the configuration of the electric-generating element 20 will be described. FIG. 3 is a developed view of the electric-generating element 20.

As shown in FIG. 3, the electric-generating element 20 has a positive electrode plate 201, a negative electrode plate 202, and a separator 203. The positive electrode plate 201 has a collector plate 201a and a positive electrode active material layer 201b formed on a surface of the collector plate 201a. The positive electrode active material layer 201b includes a positive electrode active material, a conductive agent, a binder and the like. The positive electrode active material layer 201b is formed in a partial area of the collector plate 201a, and the remaining area of the collector plate 201a is exposed.

The negative electrode plate 202 has a collector plate 202a and a negative electrode active material layer 202b formed on a surface of the collector plate 202a. The negative electrode active material layer 202b includes a negative electrode active material, a conductive agent, a binder and the like. The negative electrode active material layer 202b is formed in a partial area of the collector plate 202a, and the remaining area of the collector plate 202a is exposed. The separator 203 includes an electrolytic solution.

The positive electrode plate 201, the negative electrode plate 202, and the separator 203 are stacked in the order shown in FIG. 3, and the resulting stack is wound up to form the electric-generating element 20. The stack is wound around an axis extending in the Y direction. In FIG. 2, only the collector plate 201a of the positive electrode plate 201 is wound at one end portion of the electric-generating element 20 in the Y direction. The positive electrode tab 23 is fixed to that collector plate 201a. Only the collector plate 202a of the negative electrode plate 202 is wound at the other end portion of the electric-generating element 20 in the Y direction. The negative electrode tab 24 is fixed to that collector plate 202a.

A region R shown in FIG. 2 represents a region in which the positive electrode active material layer 201b of the positive electrode plate 201 and the negative electrode active material layer 202b of the negative electrode plate 202 overlap each other, and is a region for use in charge and discharge of the cell 1.

Next, the manufacture process of the cell 1 will be described in brief.

First, the positive electrode terminal 21 and the negative electrode terminal 22 are fixed to the lid 12. The electric-generating element 20 manufactured in advance is prepared, and the positive electrode tab 23 is fixed to the electric-generating element 20 and to the positive electrode terminal 21. Similarly, the negative electrode tab 24 is fixed to the electric-generating element 20 and to the negative electrode terminal 22. This can fix the positive electrode terminal 21, the negative electrode terminal 22, and the electric-generating element 20 to the lid 12.

Next, the electric-generating element 20 is put into the case body 11, and the opening portion 11a of the case body 11 is closed by the lid 12. The lid 12 and the case body 11 are fixed to each other by welding, for example. The lid 12 has the injection portion to be closed by the cap 122, and the electrolytic solution is injected through the injection portion into the battery case 10. The injection of the electrolytic solution allows the electric-generating element 20 to be impregnated with the electrolytic solution. Specifically, the electrolytic solution soaks into the separator 203, between the separator 203 and the positive electrode plate 201, and between the separator 203 and the negative electrode plate 202.

After the injection of the electrolytic solution, the injection portion is closed by the cap 122 to allow the battery case 10 to be hermetically sealed, so that it is possible to prevent any leak of the electrolytic solution from the battery case 10.

Figure 4:
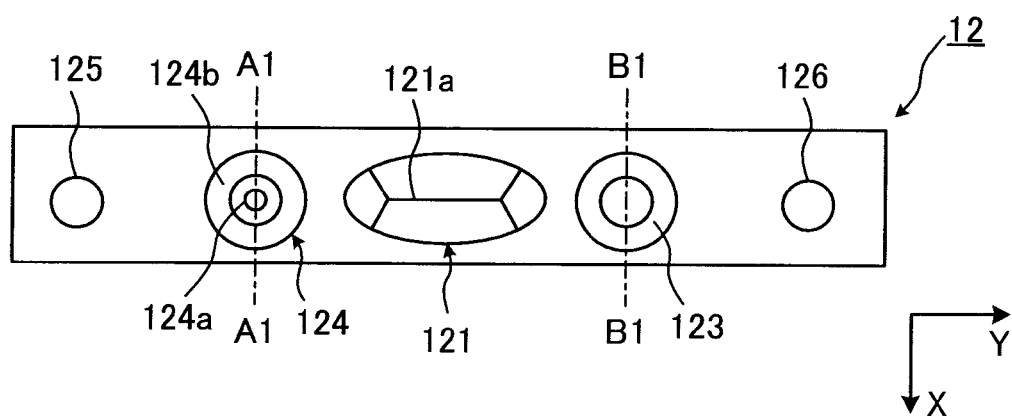
FIG. 4 is a top view of a battery lid in Embodiment 1.
Figure 5:
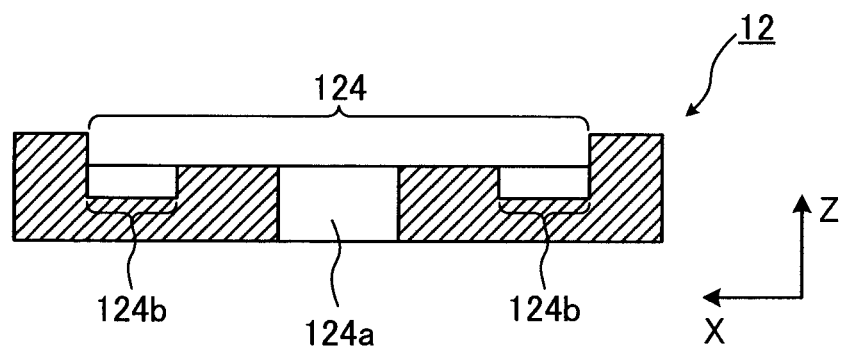
FIG. 5 is a section view taken along A1-A1 in FIG. 4.
Figure 6:
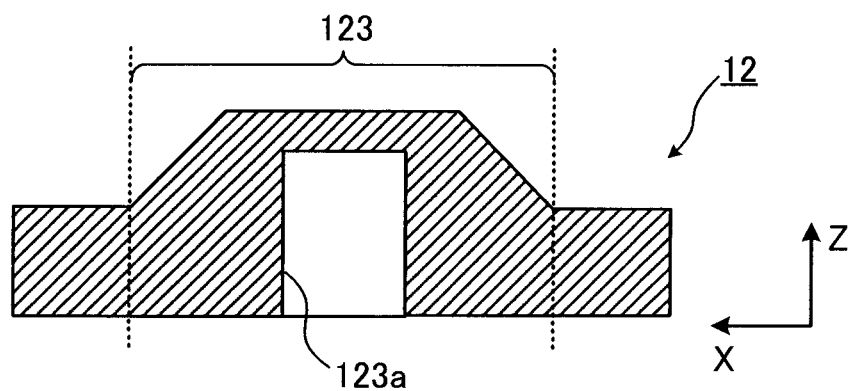
FIG. 6 is a section view taken along B1-B1 in FIG. 4.

Next, the structure of the lid 12 in the present embodiment will be described specifically. FIG. 4 is a top view of the lid 12. FIG. 5 is a section view taken along A1-A1 in FIG. 4, and FIG. 6 is a section view taken along B1-B1 in FIG. 4.

The valve 121 is provided by forming an inscription 121a in a surface of the lid 12. As shown in FIG. 4, the valve 121 is formed at the center of the lid 12. Alternatively, the valve 121 can be formed at a position shifted from the center of the lid 12. The inscription 121a is formed symmetrically with respect to the center of the valve 121.

The formation of the inscription 121a in the lid 12 can lower the strength of the portion having the inscription 121a formed therein as compared with the strength of the other portions. When the internal pressure of the battery case 20 reaches the operation pressure of the valve 121, the inscription 121a is broken to change the valve 121 from the closed state to the open state. The shape of the inscription 121a can be set as appropriate based on the operation pressure of the valve 121 or the like.

The lid 12 has the injection portion 124 which has a through-hole 124a. The through-hole 124a passes through the lid 12 and is used for injecting the electrolytic solution into the battery case 10. The injection portion 124 has a groove 124b around the through-hole 124a. When the lid 12 is viewed from the Z direction, the groove 124b is formed in a ring shape on an outer wall face of the lid 12. The outer wall face of the lid 12 is a wall face on the outside of the battery case 10.

The lid 12 has a through-hole 125 to which the positive electrode terminal 21 is attached. The positive electrode terminal 21 passes through the through-hole 125, and a portion of the positive electrode terminal 21 lies within the battery case 10 as shown in FIG. 2. The injection portion 124 is provided between the through-hole 125 and the valve 121.

The lid 12 has a through-hole 126 to which the negative electrode terminal 22 is attached. The negative electrode terminal 22 passes through the through-hole 126, and a portion of the negative electrode terminal 22 lies within the battery case 10 as shown in FIG. 2. The worked portion 123 is provided between the through-hole 126 and the valve 121.

Figure 7:
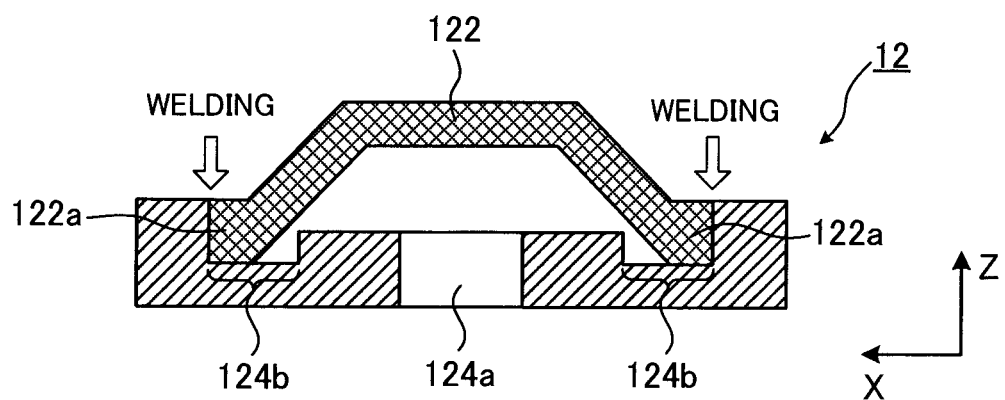
FIG. 7 is a section view showing the structure in which an injection portion is closed by a cap in Embodiment 1.

As shown in FIG. 7, the cap 122 is fixed to the injection portion 124 and closes the injection portion 124. FIG. 7 is a diagram corresponding to FIG. 5. A leg 122a of the cap 122 is formed in a shape conforming to the groove 124b of the injection portion 124 and is in contact with the groove 124b. The leg 122a and the groove 124b can be fixed to each other by welding. Since the cap 122 is separate from the through-hole 124a but closes the injection portion 124, the electrolytic solution is not leaked from the through-hole 124a.

The worked portion 123 is provided at a position symmetrical with respect to the valve 121 to the position where the injection portion 124 and the cap 122 are provided. In other words, the interval (distance in the Y direction) between the valve 121 and the worked portion 123 is equal to the interval (distance in the Y direction) between the valve 121 and the injection portion 124.

The worked portion 123 has a shape shown in FIG. 6. The worked portion 123 is formed in a protrusion shape on the outer wall face of the lid 12 and has a groove 123a in an inner wall face of the lid 12. No through-hole passing through the lid 12 is formed in the worked portion 123.

The outer shape of the worked portion 123 shown in FIG. 6 conforms to the outer shapes of the cap 122 and the injection portion 124 shown in FIG. 7. The groove 123a of the worked portion 123 corresponds to the through-hole 124a of the injection portion 124. The portion of the worked portion 123 that is formed on the outer wall face of the lid 12 corresponds to the cap 122. The worked portion 123 can be formed by pressing, for example.

If the worked portion 123 is omitted and a flat face is used to provide the region where the worked portion 123 is formed (the outer wall face and the inner wall face of the lid 12), variations occur in the strength of the lid 12. Specifically, the region between the valve 121 and the positive electrode terminal 21 and the region between the valve 121 and the negative electrode terminal 22 have different structures to vary the strength of the lid 12. If variations occur in the strength of the lid 12, the stress may concentrate only on a portion of the valve 121.

In the present embodiment, the injection portion 124 and the cap 122 are provided on the side of the valve 121 closer to the positive electrode terminal 21, and the worked portion 123 is provided on the side of the valve 121 closer to the negative electrode terminal 22. Since the outer shape of the worked portion 123 conforms to the outer shapes of the injection portion 124 and the cap 122, any variations in the strength of the lid 12 can be suppressed. This can prevent stress from concentrating only on a portion of the valve 121. When the internal pressure of the battery case 10 reaches the operation pressure of the valve 121, the entire valve 121 can efficiently change from the closed state to the open state.

While the interval between the valve 121 and the worked portion 123 is set to be equal to the interval between the valve 121 and the injection portion 124 in the present embodiment, the two intervals can be different. When the injection portion 124 and the cap 122 are provided between the valve 121 and the positive electrode terminal 21 (or the negative electrode terminal 22) and the worked portion 123 is provided between the valve 121 and the negative electrode terminal 22 (or the positive electrode terminal 21), the equal structures can be provided on both sides of the valve 121. This can suppress variations in the strength of the lid 12.

While the worked portion 123 is formed to have the sectional shape shown in FIG. 6 in the present embodiment, the present invention is not limited thereto. The sectional shape of the worked portion 123 can be determined with reference to the shape shown in FIG. 7. For example, the shape of the groove 123a shown in FIG. 6 can be changed.

Embodiment 2

The structure of a cell which is Embodiment 2 of the present invention will be described. In the present embodiment, the structure of a lid 12 is changed as compared with the cell 1 in Embodiment 1. Members having the same functions as those of the members described in Embodiment 1 are designated with the same reference numerals. In the following, description will be made mainly of points different from Embodiment 1.

Figure 8:
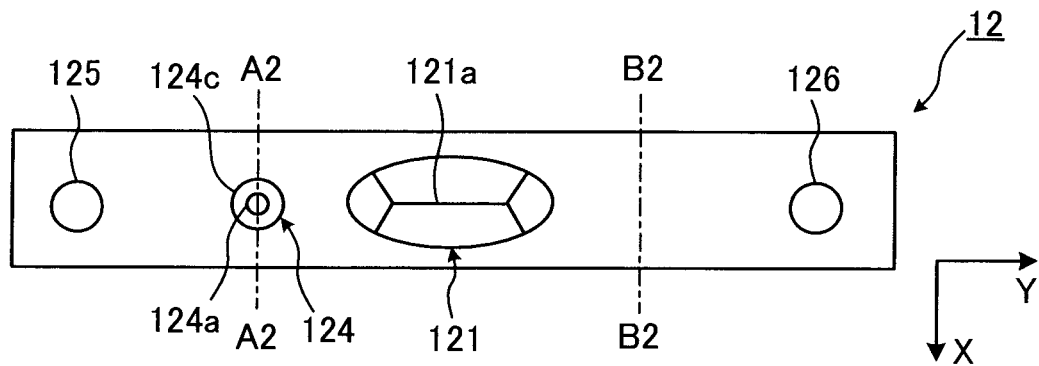
FIG. 8 is a top view of a battery lid in Embodiment 2.
Figure 9:
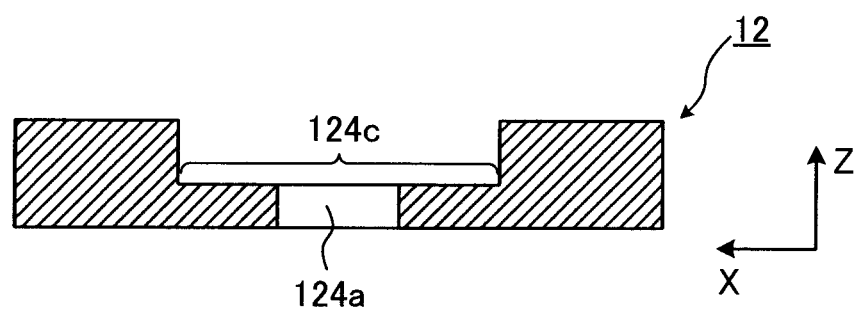
FIG. 9 is a section view taken along A2-A2 in FIG. 8.
Figure 10:
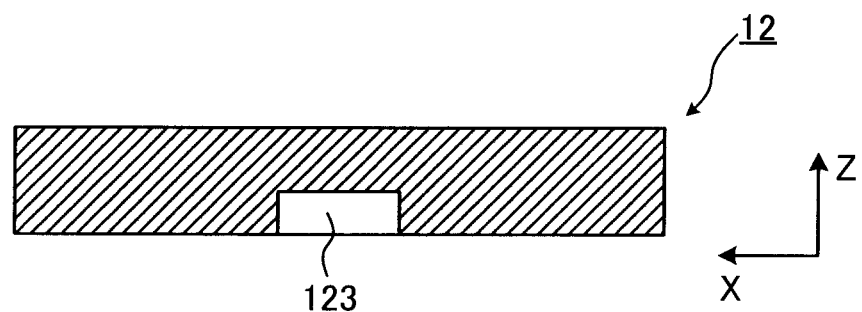
FIG. 10 is a section view taken along B2-B2 in FIG. 8.

FIG. 8 is a top view of the lid 12 in the present embodiment. FIG. 9 is a section view taken along A2-A2 in FIG. 8, and FIG. 10 is a section view taken along B2-B2 in FIG. 8.

An injection portion 124 is provided between a valve 121 and a through-hole 125. As shown in FIG. 9, the injection portion 124 has a groove 124c formed in an outer wall face of the lid 12 and a through-hole 124a formed in the bottom of the groove 124c.

Figure 11:
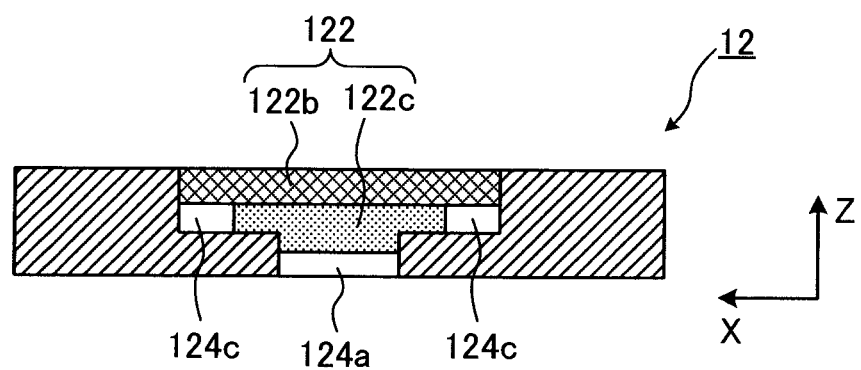
FIG. 11 is a section view showing the structure in which an injection portion is closed by a cap in Embodiment 2.
Figure 12:
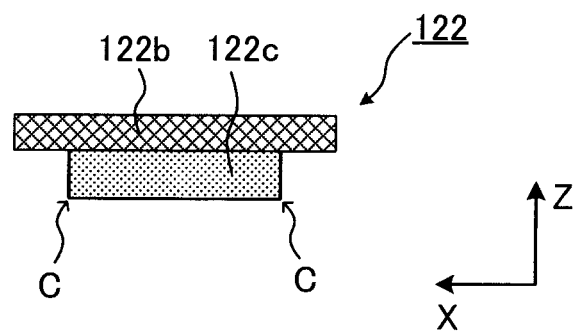
FIG. 12 is a section view of the cap in Embodiment 2.

As shown in FIG. 11, the injection portion 124 is closed by a cap 122. FIG. 11 corresponds to FIG. 9. The cap 122 has a cap body 122b and a rubber 122c. FIG. 12 shows the structure of the cap 122 before attachment to the injection portion 124. The cap body 122b is formed along the groove 124c of the injection portion 124 and can close the groove 124c. The cap body 122b can be fixed to the groove 124c by welding, for example. The cap body 122b can be formed of a material (metal) identical to that of the lid 12 or can be formed of a material (metal) different from that of the lid 12.

The rubber 122c is fixed to the cap body 122b with an adhesive or the like. The rubber 122c can be elastically deformed and can be formed of EPDM (ethylene-propylene-diene rubber). When the cap 122 is attached to the injection portion 124, each corner C of the rubber 122c is deformed along the injection portion 124. This allows the rubber 122c to close the through-hole 124a of the injection portion 124.

While the rubber 122c is fixed to the cap body 122b in the present embodiment, the rubber 122c may not be fixed thereto. Specifically, after the through-hole 124a of the injection portion 124 is closed by the rubber 122c, the cap body 122b can be fixed to the groove 124c of the injection portion 124. Since the cap body 122b presses the rubber 122c against the through-hole 124a, the rubber 122c is not shifted from the through-hole 124a.

While the rubber 122c is formed to be smaller than the cap body 122b as shown in FIG. 12 in the present embodiment, the rubber 122c and the cap body 122b can be formed to have the same size. The rubber 122c can be omitted and only the cap body 122b can close the injection portion 124.

A worked portion 123 is formed in a depression shape in an inner wall face of the lid 12. The worked portion 123 has a shape conforming to the space formed by the rubber 122c and the through-hole 124a.

In the present embodiment, the formation of the worked portion 123 provides the lid 12 with the structure similar to the sectional structure including the cap 122 and the injection portion 124. Thus, the similar structures can be provided on both sides of the valve 121 to suppress variations in the strength of the lid 12. The suppression of variations in the strength of the lid 12 can suppress stress concentration only on a portion of the valve 121.

Embodiment 3

The structure of a cell which is Embodiment 3 of the present invention will be described. In the present embodiment, the structure of a lid 12 is changed as compared with the cell 1 in Embodiment 1. Members having the same functions as those of the members described in Embodiment 1 are designated with the same reference numerals. In the following, description will be made mainly of points different from Embodiment 1.

Figure 13:
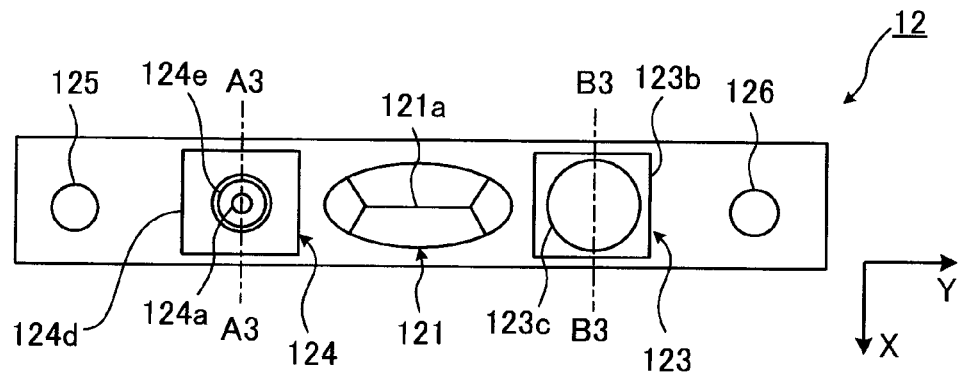
FIG. 13 is a top view of a battery lid in Embodiment 3.
Figure 14:
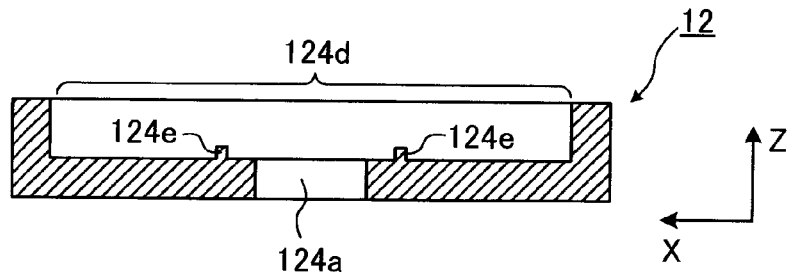
FIG. 14 is a section view taken along A3-A3 in FIG. 13.
Figure 15:
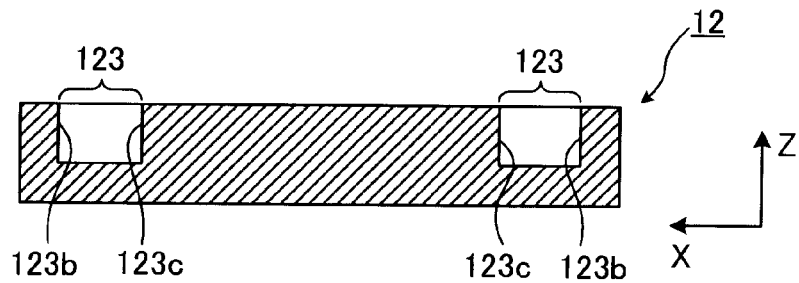
FIG. 15 is a section view taken along B3-B3 in FIG. 13.

FIG. 13 is a top view of the lid 12 in the present embodiment. FIG. 14 is a section view taken along A3-A3 in FIG. 13, and FIG. 15 is a section view taken along B3-B3 in FIG. 13.

An injection portion 124 is provided between a valve 121 and a through-hole 125. As shown in FIG. 14, the injection portion 124 has a groove 124d formed on an outer wall face of the lid 12. When viewed from the Z direction, the groove 124d is formed in a rectangular shape. A through-hole 124a and a protrusion 124e are provided at the bottom of the groove 124d. When the injection portion 124 is viewed from the Z direction, the protrusion 124e is formed in a ring shape around the through-hole 124a.

Figure 16:
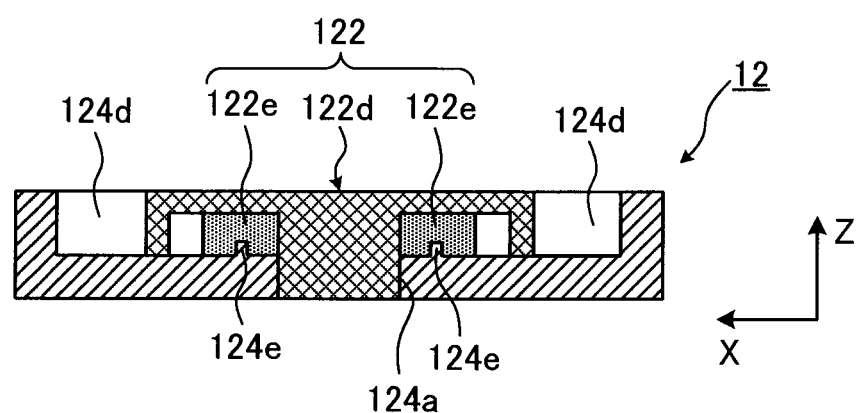
FIG. 16 is a section view showing the structure in which an injection portion is closed by a cap in Embodiment 3.
Figure 17:
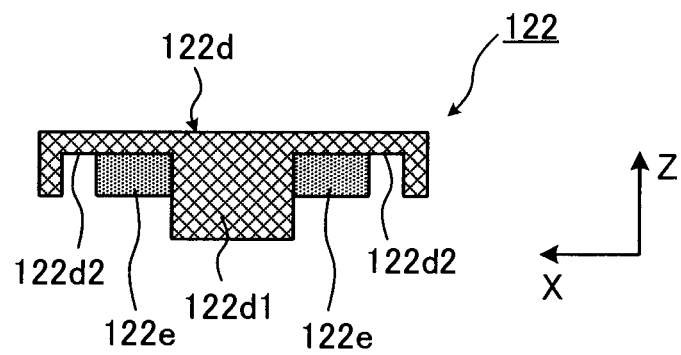
FIG. 17 is a section view of the cap in Embodiment 3.

As shown in FIG. 16, the injection portion 124 is closed by a cap 122. FIG. 16 corresponds to FIG. 14. The cap 122 has a cap body 122d and a rubber 122e. FIG. 17 shows the structure of the cap 122 before attachment to the injection portion 124.

The cap body 122d has a column 122d1 extending toward the inside of the battery case 10 and a groove 122d2 formed around the column 122d1. When the cap 122 is viewed from the Z direction, the groove 122d2 is formed in a ring shape around the column 122d1. In attaching the cap 122 to the injection portion 124, the column 122d1 enters into the through-hole 124a of the injection portion 124. The cap body 122d can be fixed to the groove 124d by welding, for example.

The rubber 122e is fixed to the groove 122d2 of the cap body 122d with an adhesive or the like. The rubber 122e can be elastically deformed and can be formed of EPDM (ethylene-propylene-diene rubber). The rubber 122e is formed along the groove 122d2 of the cap body 122d, and in other words, is formed in a ring shape.

When the cap 122 is attached to the injection portion 124, a portion of the rubber 122e is deformed along the protrusion 124e. The deformation of the rubber 122e along the protrusion 124e can position the cap 122 with respect to the injection portion 124.

While the rubber 122e is fixed to the cap body 122d in the present embodiment, the rubber 122e may not be fixed. Specifically, the rubber 122e may only be fitted into the groove 122d2 of the cap 122d. Alternatively, the rubber 122c can be omitted and only the cap body 122d can close the injection portion 124.

A worked portion 123 is formed of a groove formed in an outer wall face of the lid 12. The worked portion 123 has a shape conforming to the outer shapes of the cap 122 and the injection portion 124. Specifically, the worked portion (groove) 123 is formed along the groove 124d of the injection portion 124 and the outer face of the cap 122 (cap body 122d).

When the worked portion 123 is viewed from the Z direction (see FIG. 13), the worked portion (groove) 123 has a wall face 123b formed along a rectangle and a wall face 123c formed along a circle. The wall face 123b is provided to correspond to the groove 124d, whereas the wall face 123c is provided to correspond to the cap 122.

In the present embodiment, the formation of the worked portion 123 provides the lid 12 with the structure similar to the sectional structure including the cap 122 and the injection portion 124. Thus, the similar structures can be provided on both sides of the valve 121 to suppress variations in the strength of the lid 12. The suppression of variations in the strength of the lid 12 can suppress stress concentration only on a portion of the valve 121.

The present invention is not limited to Embodiments 1 to 3 described above. Specifically, the shapes of the injection portion 124 and the cap 122 can be set as appropriate. Once the shapes of the injection portion 124 and the cap 122 are determined, the worked portion 123 can be formed in a shape conforming the outer shapes of the injection portion 124 and the cap 122. The outer shape of the worked portion 123 does not need to exactly coincide with the outer shapes of the injection portion 124 and the cap 122 but is only required to have a similar outer shape to those of the injection portion 124 and the cap 122.

The invention claimed is:

1. An electric storage apparatus comprising: an electric-generating element performing charge and discharge; and
 a case accommodating the electric-generating element and an electrolytic solution,
 wherein the case includes:
 an injection portion used for injecting the electrolytic solution into the case;
 a cap closing the injection portion;
 a worked portion provided by working a wall face itself of the case corresponding to outer shapes of the injection portion and the cap; and
 a valve provided between the injection portion and the worked portion and configured to discharge gas produced within the case to the outside of the case.

2. The electric storage apparatus according to claim 1, wherein the worked portion is formed of a protrusion and a depression formed in at least one of an inner wall face and an outer wall face of the case.

3. The electric storage apparatus according to claim 1, wherein the injection portion and the worked portion are provided at positions symmetrical with respect to the valve.

4. The electric storage apparatus according to claim 1, further comprising a positive electrode terminal and a negative electrode terminal which are connected to the electric-generating element and are fixed to the case.

5. The electric storage apparatus according to claim 1, wherein the case has a case body and a lid, the case body including an opening portion configured to insert the electric-generating element, the lid closing the opening portion, and
 the lid has the injection portion, the cap, the worked portion, and the valve.

6. The electric storage apparatus according to claim 5, wherein the valve is provided at the center of the lid.

7. The electric storage apparatus according to claim 1, wherein the valve is a valve irreversibly changing from a closed state to an open state.

8. The electric storage apparatus according to claim 1, wherein the cap has a cap body fixed to the injection portion and a rubber placed between the cap body and the injection portion.

9. The electric storage apparatus according to claim 1, wherein the case is formed in a shape conforming to a rectangle.

10. The electric storage apparatus according to claim 1, wherein the cap and the worked portion protrude outside the case.

11. The electric storage apparatus according to claim 1, wherein the injection portion comprises a through hole passing through the case, and the cap closes the through hole in a state that the cap is separate from the through hole.

12. The electric storage apparatus according to claim 1, wherein the worked portion comprises a groove formed on an inner wall face of the case.

* * * * *